(12) United States Patent
Greenwood et al.

(10) Patent No.: US 7,589,480 B2
(45) Date of Patent: Sep. 15, 2009

(54) HIGH INTENSITY DISCHARGE LAMP BALLAST

(75) Inventors: Simon Richard Greenwood, Nantwich (GB); Stephen Soar, Bury (GB)

(73) Assignee: Greenwood Soar IP Ltd. (GB)

( * ) Notice: Subject to any disclaimer, the term of this patent is extended or adjusted under 35 U.S.C. 154(b) by 420 days.

(21) Appl. No.: 11/442,627

(22) Filed: May 26, 2006

(65) Prior Publication Data

US 2007/0273304 A1  Nov. 29, 2007

(51) Int. Cl.
 H05B 37/02  (2006.01)
(52) U.S. Cl. .................. 315/307; 315/224; 315/225; 315/297
(58) Field of Classification Search ............. 315/209 R, 315/224–225, 247, 276, 283, 289, 291, 307–308, 315/DIG. 7
See application file for complete search history.

(56) References Cited

U.S. PATENT DOCUMENTS

| | | | |
|---|---|---|---|
| 3,710,177 A | 1/1973 | Ward | |
| 3,890,537 A | 6/1975 | Park et al. | |
| 4,053,813 A | 10/1977 | Kornrumpf et al. | |
| 4,060,752 A | 11/1977 | Walker | |
| 4,186,437 A | 1/1980 | Cuk | |
| 4,498,031 A | 2/1985 | Stupp et al. | |
| 4,538,093 A | 8/1985 | Melai | |
| 4,594,531 A | 6/1986 | Ganser et al. | |
| 4,717,863 A | 1/1988 | Zeiler | |
| 4,719,390 A | 1/1988 | Sairanen | |
| 4,723,098 A | 2/1988 | Grubbs | |
| 4,734,624 A | 3/1988 | Nagase et al. | |
| 4,873,471 A | 10/1989 | Dean et al. | |
| 4,881,011 A | 11/1989 | Britton | |
| 4,893,063 A | 1/1990 | Pernyeszi | |
| 4,926,302 A | 5/1990 | Harada et al. | |
| 4,935,669 A | 6/1990 | Nilssen | |
| 4,952,849 A | 8/1990 | Fellows et al. | |
| 5,021,714 A | 6/1991 | Swanson et al. | |
| 5,049,790 A | 9/1991 | Herfurth et al. | |

(Continued)

FOREIGN PATENT DOCUMENTS

EP  0 091 724 A1  10/1983

(Continued)

OTHER PUBLICATIONS

Eugene Hnatek, *Design of Solid-State Power Supplies*, Third Edition, 1989, Van Nostrand, pp. 64-67 and 350-351.

(Continued)

*Primary Examiner*—David Hung Vu
*Assistant Examiner*—Tung X Le
(74) *Attorney, Agent, or Firm*—Reinhart Boerner Van Deuren P.C.

(57) ABSTRACT

A low current loss ballast operates a high intensity discharge lamp with or without radioactive krypton. A by-pass capacitor in conjunction with a resonant strike circuit limits high frequency ripple applied to a lamp during continuing operation. Different resistor combinations are connected to drive dual buck converters of the ballast. One combination is used for high frequency operation for striking. Another combination is used during low frequency operation to limit current loss. In a strike mode of operation, combinations of signals at a resonant frequency for striking and subharmonic frequencies are applied to a resonant circuit. The signals at the subharmonic have less than a 50% duty cycle.

26 Claims, 3 Drawing Sheets

U.S. PATENT DOCUMENTS

| | | | |
|---|---|---|---|
| 5,111,118 A | 5/1992 | Fellows et al. | |
| 5,198,728 A | 3/1993 | Bernitz et al. | |
| 5,371,440 A | 12/1994 | Liu et al. | |
| 5,381,076 A | 1/1995 | Nerone | |
| 5,406,177 A | 4/1995 | Nerone | |
| 5,422,545 A | 6/1995 | Felper et al. | |
| 5,491,386 A | 2/1996 | Eriguchi et al. | |
| 5,563,477 A | 10/1996 | Ribarich et al. | |
| 5,574,338 A | 11/1996 | Kuusisto et al. | |
| 5,583,402 A * | 12/1996 | Moisin et al. | 315/307 |
| 5,589,742 A | 12/1996 | Ueda | |
| 5,623,188 A | 4/1997 | Bildgen | |
| 5,677,602 A | 10/1997 | Paul et al. | |
| 5,680,015 A | 10/1997 | Bernitz et al. | |
| 5,717,295 A | 2/1998 | Nerone | |
| 5,719,472 A | 2/1998 | Kachmarik et al. | |
| 5,723,953 A | 3/1998 | Nerone et al. | |
| 5,796,214 A * | 8/1998 | Nerone | 315/209 R |
| 5,801,491 A | 9/1998 | Canova | |
| 5,838,117 A | 11/1998 | Nerone | |
| 5,844,380 A | 12/1998 | Siepkes | |
| 6,020,688 A * | 2/2000 | Moisin | 315/209 R |
| 6,122,182 A * | 9/2000 | Moisin | 363/39 |
| 6,194,845 B1 * | 2/2001 | Konopka et al. | 315/291 |
| 6,384,544 B1 | 5/2002 | Greenwood et al. | |
| 6,495,971 B1 * | 12/2002 | Greenwood et al. | 315/291 |
| 6,744,222 B2 * | 6/2004 | Kisaichi et al. | 315/291 |
| 6,791,285 B2 | 9/2004 | Greenwood et al. | |
| 6,838,834 B2 | 1/2005 | Okawa | |
| 2005/0225262 A1 * | 10/2005 | Lurkens et al. | 315/291 |
| 2005/0248289 A1 * | 11/2005 | Van Casteren et al. | 315/224 |
| 2006/0082330 A1 | 4/2006 | Montante | |

FOREIGN PATENT DOCUMENTS

| | | |
|---|---|---|
| EP | 0 271 396 A1 | 6/1988 |
| EP | 0 279 489 A1 | 8/1988 |
| EP | 0 408 121 A2 | 1/1991 |
| EP | 0 456 247 A1 | 11/1991 |
| EP | 0 583 841 A2 | 8/1993 |
| EP | 0 984 670 A2 | 3/2000 |
| GB | 2319 677 A | 5/1998 |
| GB | 2 397 182 A | 7/2004 |

OTHER PUBLICATIONS

Cuk & Erickson, "A Conceptually New High-Frequency Switched-Mode Power Amplifier Technique Eliminates Current Ripple," *Proceedings of PowerCon® 5* conference, May 4-6, 1978; pp. 401, 403 and 419.

Texas Instruments description of their TPS5210 integrated circuit; Sep. 1998—revised May 1999.

PCT/GB2006/001952 International Search Report and Written Opinion dated Jan. 3, 2007.

* cited by examiner

HIGH INTENSITY DISCHARGE LAMP BALLAST

BACKGROUND

The present embodiments relate to an electronic control circuit which is particularly, though not exclusively, suited to the ballasting of low and high pressure sodium, mercury arc and metal halide discharge lamps (high intensity discharge lamps or HID lamps). Typically, such systems are used for highway lighting, architectural floodlighting, warehouse, retail display lighting or industrial lighting.

FIG. 4 of U.S. Pat. No. 6,384,544 shows a circuit topology with two independent buck converters operable in two modes. A frequency control circuit controls an oscillator to output a square wave. The output of the oscillator is split, one half being passed through an inverter, to create two complementary outputs in anti-phase with each other. These anti-phase outputs are connected to the inputs of two dual input AND gates, the other inputs of the two AND gates being connected to the output of a voltage comparator. The outputs of the two AND gates are connected to a MOS gate driver IC, which drives a pair of MOSFETs via gate drive resistors. Each MOSFET is serially connected to a fast recovery diode. The respective MOSFET to diode connection nodes A and AA are further connected to separate inductors, which are connected to each other at node B, which is also connected to capacitor and lamp. The capacitor is connected to node C. The lamp is returned to node C via the primary winding of current transformer. Node C provides a current return path for capacitor and lamp via capacitors to the +HT and 0V rails.

In the first mode of operation, the frequency control circuit sets the oscillator frequency to typically several tens of kilohertz. The output of the voltage comparator (node F) is a logic 1 so the anti-phase complementary outputs from the oscillator and the inverter are "passed" by the AND gates, driving the inputs of the MOS gate driver IC, which in turn drives the gates of the MOSFETs. The alternate switching of the MOSFETs alternately connects node A to the +HT rail and node AA to the 0V rail so that the LC resonant circuit comprising the inductors and a capacitor is stimulated alternately via node A and one of the inductors and via node AA and the other of the inductors at the fundamental resonant frequency of the resonant LC components or a harmonic thereof. Voltage multiplication occurs at node B owing to the Q-factor of the resonant components. The resonant components are designed with sufficient Q-factor to provide a voltage capable of ionising the gas filling the arc tube of lamp, thus initiating an arc at the lamp electrodes.

This arc is sustained by current flowing via the primary winding of a current transformer and node C to the capacitors, which allow the current to return to the +HT and 0V rails. The arc impedance is sufficiently low to divert most of the current flowing in the inductors away from the capacitor and via the lamp. The circuit operates in this first mode until the lamp electrodes are sufficiently heated to establish thermionic emission. The circuit is then switched to the second of the two discrete modes of operation.

In the second mode of operation, the frequency control circuit sets the oscillator to a second, lower frequency, typically though not exclusively several tens or hundreds of hertz. Since thermionic emission is already established in the lamp by the heating of the electrodes in the first mode of operation, the voltage available at the lamp terminals in this second (non-resonant) mode of operation is sufficient to maintain the arc at the lamp electrodes. The output of the voltage comparator (node F) is a logic 1 so the anti-phase complementary outputs from the oscillator and the inverter are "passed" by the AND gates, driving the inputs of the MOS gate driver IC, which in turn drives the gates of the MOSFETs. The alternate switching of the two MOSFETs on and off in opposition alternately connects node A to the +HT rail and node AA to the 0V rail. In one half cycle of the oscillator, one of the MOSFETs conducts current from the +HT rail to the lamp via node A, one of the inductors and node B; and in the opposing half cycle of the oscillator, the other of the MOSFETs conducts current from the 0V rail to the lamp via node AA, another of the inductors and node B.

Lamp current is transformed by the turns ratio of the current sensing transformer, rectified by a rectifier and converted to a positive voltage proportional to lamp current across a resistor. This voltage appears at node D and is referenced to the 0V rail. Node D is connected to the inverting input of a voltage comparator. The voltage at node D is compared with a voltage set by a potential divider (two resistors), the mid point of which (node E) is connected to the non-inverting input of the voltage comparator. Should the lamp current proportional voltage at node D exceed the voltage set by the potential divider at node E, the output (node F) of the voltage comparator is switched to a logic 0 state. Since node F is connected to the inputs of the AND gates 3 and 4, both outputs from the AND gates are then forced to a logic 0 level irrespective of the logic states of the other inputs to the AND gates set by the outputs of the oscillator and the inverter. Whichever MOSFET was conducting and sourcing current into the lamp circuit is switched to a non-conducting state and reactive current flowing in the associated inductor is circulated via the fast recovery diode. When the current value decays sufficiently to reduce the lamp current proportional voltage at node D to a voltage below that set at node E, the voltage comparator output node F returns to a logic 1 state allowing the AND gates to "pass" the relevant logic states set on their other inputs and thus to switch the relevant MOSFET to a conducting state.

Typically, the lamp current in the first mode of operation is insufficiently high to trigger operation of this current limit circuit. Since the oscillator frequency in the second mode of operation is substantially lower than in the first mode of operation, the inductors pass much higher currents as their impedance at low frequency is much lower than their impedance at high frequency. Due to the operation of the current limiting circuit, the lamp current waveform in the second mode approximates a square wave with some high frequency ripple due to the operation of the current limiting circuit superimposed on the top and bottom extremities of the waveform.

The ripple current at the lamp caused by the switching of the buck converters in the second, continuous mode of operation may not meet requirements of recent proposed international standards. The standards limit the amplitude of high frequency ripple on the lamp waveform so as to reduce the possibility of acoustic arc resonance. Recent environmental concerns have also reduced the use of radioactive elements in discharge lamps. Lamps with no or reduced radioactive krypton may be more difficult to strike. In the circuit of U.S. Pat. No. 6,384,544, a higher striking voltage may be needed.

BRIEF SUMMARY

The present invention is defined by the following claims, and nothing in this section should be taken as a limitation on those claims. By way of introduction, the preferred embodiments described below include a method and system for ballasting a high intensity discharge lamp. In one aspect, a by-pass capacitor in conjunction with a resonant strike circuit limits high frequency ripple applied to a lamp during continuing operation. In another aspect, different resistor combinations are connected to drive main switches of the ballast. One combination is used for high frequency operation for striking. Another combination is used during low frequency operation to limit switching losses. In another aspect, combinations of signals at a resonant frequency for striking and subharmonic frequencies are applied to a resonant circuit in a strike mode of operation. The signals at the subharmonic may have less than a 50% duty cycle. Any one or combinations of these aspects may be used.

DETAILED DESCRIPTION OF THE DRAWINGS AND THE PRESENTLY PREFERRED EMBODIMENTS

Figure 1:
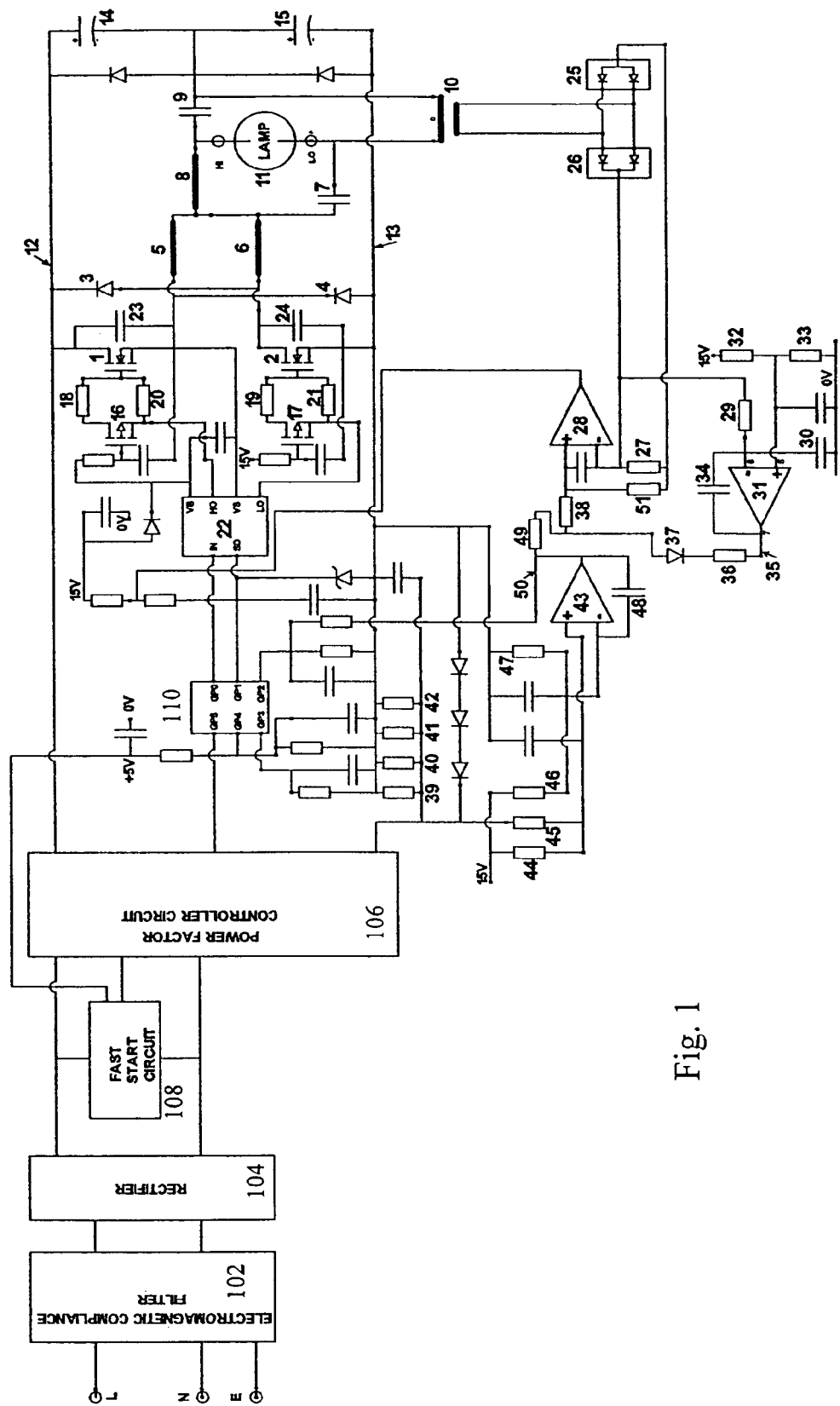
FIG. 1 illustrates a high intensity discharge lamp ballast according to one embodiment.

The circuit illustrated in FIG. 1 has the same general topology of a dual buck converter output stage comprising semiconductor switching devices 1 and 2, diodes 3 and 4, and inductors 5 and 6 connected between high voltage DC bus positive and negative rails 12 and 13 as described in U.S. Pat. No. 6,384,544, the disclosure of which is incorporated herein by reference. The components, connections and alternatives provided in U.S. Pat. No. 6,384,544 may be used in the circuit shown in FIG. 1. The different components may be implemented by any now known or later developed device, such as the main switches 1, 2 being MOSFETS, bi-polar switches and/or IGBT devices. Similar but new components described herein may be of the same type of device or alternatives listed in U.S. Pat. No. 6,384,544. For example, the comparators 28, 31 and/or 43 may be same type of device as the comparators 5 or 6 in U.S. Pat. No. 6,384,544.

The circuit of FIG. 1 differs from the illustration of FIG. 4 of U.S. Pat. No. 6,384,544. First, FIG. 1 includes an electromagnetic compliance filter 102, a rectifier 104, and a power factor controller 106. Any now known or later developed circuits for these components may be used.

Second, FIG. 1 also includes a controller 110. U.S. Pat. No. 6,384,544 describes the frequency control circuit without illustration. The controller 110 is a microprocessor, general processor, integrated circuit, application specific integrated circuit, field programmable gate array, analog circuit, digital circuit, combinations thereof or other now known or later developed control device. The controller 110 controls operation of the power factor controller 106, temperature control, reference voltages, and/or a gate driver circuit 22. The controller 110 includes an oscillator or controls an oscillator in the gate driver integrated circuit (IC) 22 for operating the main switches 1 and 2.

Figure 2:
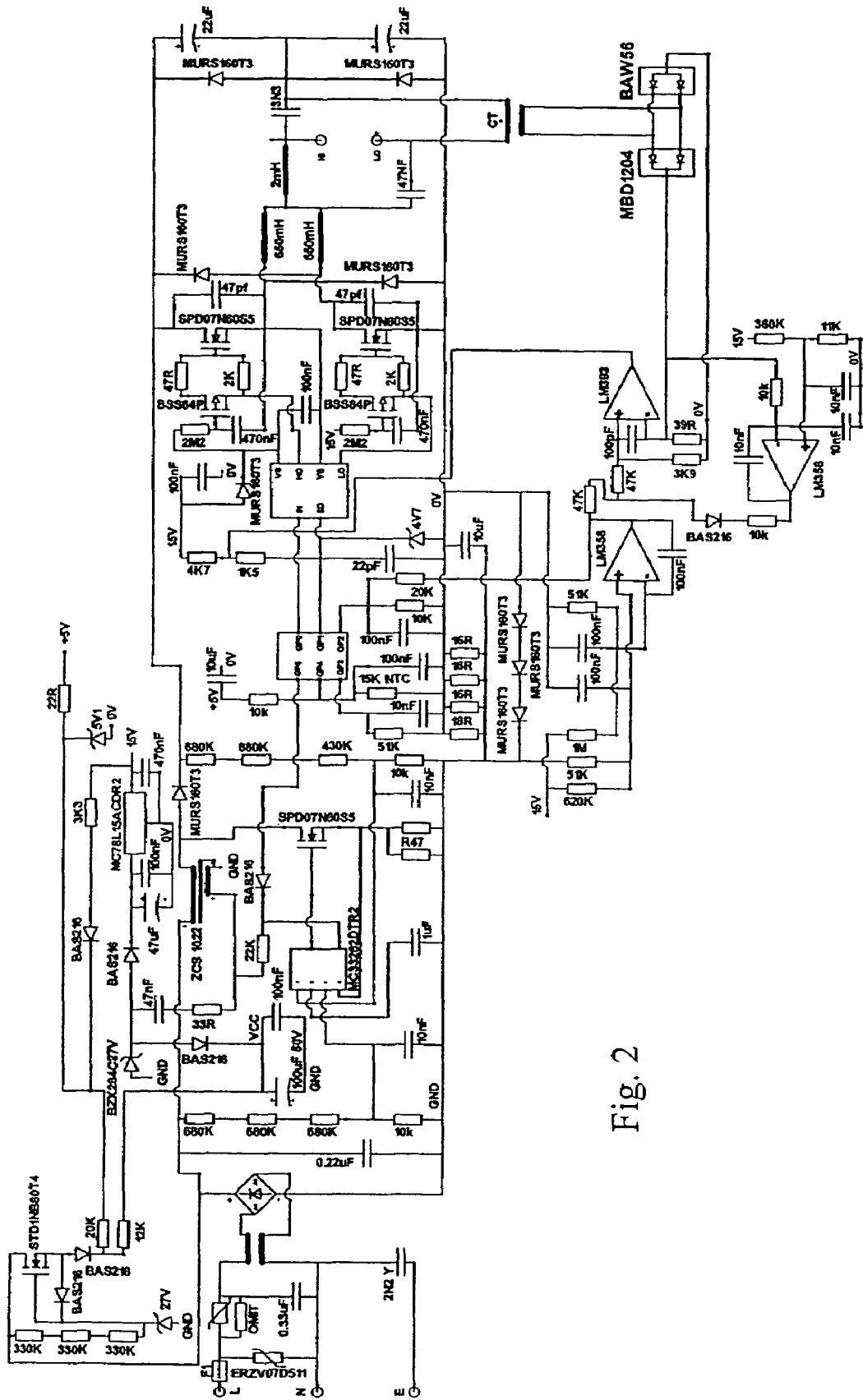
FIG. 2 illustrates a circuit diagram of one embodiment of the ballast of FIG. 1.

Third, FIG. 1 includes a fast start circuit 108. As shown in FIG. 2, the fast start circuit 108 includes a transistor, a plurality of diodes and resistors. Additional, different or fewer components may be provided. The fast start circuit 108 is a voltage source supply independent of mains voltage which allows the power factor controller 106 and the controller 110 to be powered up when required at mains power up or under control of the stored program in the controller 110. During a shutdown period caused by the stored program in the controller 110, the supply of current to the controller 110 is maintained by the fast start circuit 108 so as to allow the controller 110 to maintain position in the stored program and thus schedule events that are time based. The fast start circuit 108 also allows the voltage to be maintained on the power factor controller circuit supply such that when the stored program in the controller 110 demands that the power factor controller 106 be operable, the power factor controller 106 is immediately ready for such operation.

Fourth, the gate driver IC 22 connects with the switches 1 and 2 through gate driver circuits. Each gate driver circuit includes a switch 16, 17, low value resistors 18, 19 and high value resistors 20, 21. The gate driver IC 22 is an integrated circuit, but may be a processor, field programmable gate array, analog circuit, digital circuit or other device for controlling the main switches 1, 2. The switches 16, 17 are semiconductor switches, such as transistors or MOSFETs, but may be other digital or analog switches now known or later developed. The switches 16 and 17 may be referred to as performance switches since the performance of the gate driving circuit varies based on the operation of the switches 16, 17. The low and high value terminology for the resistors 18, 19, 20, 21 is relative resistances and may have any difference.

Fifth, the resonant circuit includes an additional inductor 8 connected in series between the inductors 5, 6 and the lamp terminal (HI). The inductor 8 and capacitor 9 operate as a resonance circuit for striking the lamp 11. A by-pass capacitor 7 connects the inductors 5, 6 to the other lamp terminal (LO). The by-pass capacitor is a relatively high value capacitor. One terminal of the lamp 11 is connected to the node of the inductor 8 and capacitor 9, and the other lamp terminal is connected to the node of capacitor 7 and the current transformer 10. The current transformer 10 is connected to the node of two capacitors 14 and 15, which are respectively connected to the positive and negative DC bus rails 12 and 13, thereby enabling current from lamp 11 and capacitor 7 to be returned to the DC bus rails. Additional or different components may be used for by-passing and resonating, such as further inductor, capacitor and/or resistor components.

Lastly, additional feedback control is provided. The feedback control includes the comparator 28, the amplifiers 31 and 43, resistors, capacitors and diodes. Other feedback with different, additional or fewer components may be provided. The comparator 28 and amplifiers 31, 43 are operational amplifiers, such as in an integrated circuit, but may be other digital or analog devices. The comparator 28 is a current limiting circuit operable to control operation of the dual buck converters. Other current limiting circuits may be used, such as the operational amplifier 31 (integrator) and/or operational amplifier 43. Other arrangements of components may be provided.

FIG. 2 is a circuit diagram of one embodiment of FIG. 1. FIG. 2 shows the values or parts for the various circuit components for operation as a 39 Watt universal input HID lamp ballast. Other values or parts may be used for the same or different ballasting operation.

Figure 3:
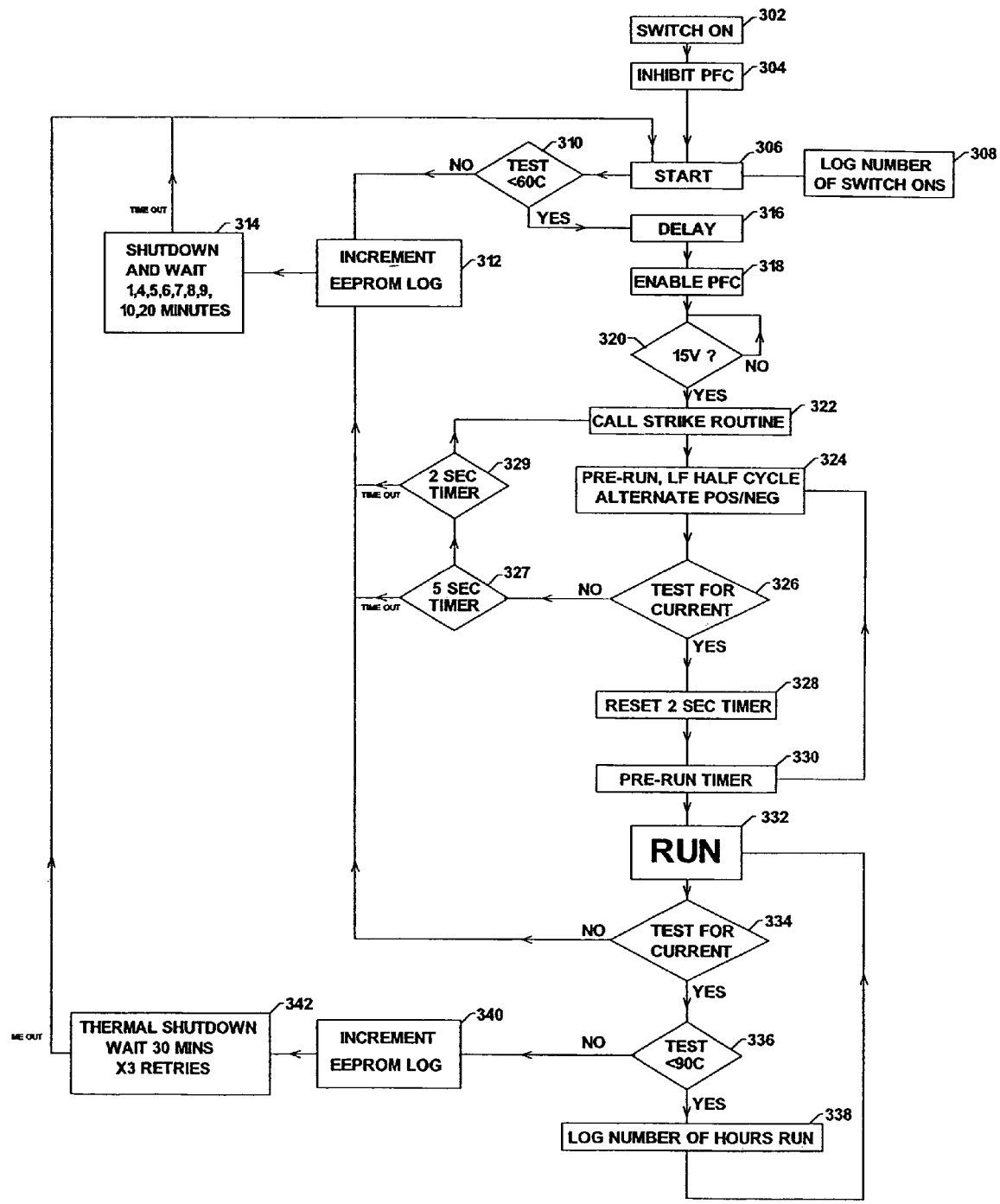
FIG. 3 illustrates a method of one embodiment for operating a high intensity discharge lamp ballast.

FIG. 3 shows one embodiment of a method for operating the high intensity discharge lamp ballast of FIG. 1 or 2, but may be used for other ballasts. Additional, different or fewer acts than shown in FIG. 3 may be used. The acts are performed in the order shown or a different order. The method of FIG. 3 and the ballast of FIG. 1 are described in combination below.

In act 302, the mains supply to the ballast is switched on and the fast start circuit provides current to the controller 110 which enables the start of the software stored program. Initially, the controller 110 inhibits operation of the power factor controller 106 in act 304. Operation starts in act 306. The start or switch on is logged in act 308. In act 310, the controller 110 tests the temperature, such as measuring a voltage across a thermistor. If the temperature is below a threshold, such as 60 degree Celsius, the method is delayed in act 316. The delay is so that repeated switching on and off of the mains will not give rise to excessive dissipation during the hi-loss first mode of operation. The thermal limit for start is so the hi-loss first mode of operation does not risk damage to the circuit due to thermal stress. Also the likelihood of the lamp being cool enough to strike if the ballast is still above 60 degrees Celsius from previous operation is almost zero. In act 318, the power factor controller 106 is released for operation. In act 320, the controller 110 tests for proper voltage output to the ballast circuit. Other start-up tests, routines or procedures may be used.

If the proper circuit voltage and temperature exist during the start-up acts, the process proceeds to one of two different modes of operation. The first mode includes acts 322-330 for striking and sufficiently ionizing the gas in the lamp 11. The second mode includes acts 332-338 for running the ballast and lamp at steady state. Each of the modes may include additional, different or fewer acts.

The first mode attempts to strike the lamp 11 with a high frequency and high voltage signal. One buck converter includes the main switch 1, diode 4 and inductor 5, and another buck converter includes the main switch 2, diode 3 and inductor 6. The main switches 1, 2 are semiconductor switching devices, such as MOSFETs. The main switches 1, 2 are switched alternately ON and OFF. The current from each buck converter charges the capacitor 7 and is returned via current transformer 10 to the DC bus rails 12 and 13 via capacitors 14 and 15. The current flowing alternately in opposite directions from each buck converter in the capacitor 7 causes the capacitor to charge first in one direction and then in the other such that there is a voltage change on the capacitor 7 in response to the alternate half cycles of current from each of the buck converters. This voltage change is amplified by the LC filter and resonance circuit (inductor 8 and capacitor 9), resulting in a high voltage required for ionising the gas in the lamp arc tube 11 and initiating the arc.

The main switches 1, 2 operate at various programmed frequencies and programmed duty cycles. In act 322, the controller 110 loads a strike routine to control the frequencies and duty cycles. The strike routine may be provided by digitally stored code or program or analogue control means. The frequency of the switching of the two buck converters may be controlled within a range such that a range of tolerance in the inductor 8 and capacitor 9 is accounted for in generating resonance. Depending on where a particular combination of the inductor 8 and capacitor 9 is within the tolerance, a particular frequency causes resonance amplification by the resonance circuit. The resonance amplification causes a high voltage required for ionising the gas in the lamp 11 and initiating the arc.

In addition to tolerance of the resonance circuit, externally connected additional capacitance may shift the resonant frequency. Such external additional capacitance may be the result of long lengths of cable between the ballast and the connected lamp 11 or other externally connected capacitive elements. The variance of the frequency of the switching of the two buck converters pursuant to the strike routine accounts for likely amounts of this additional capacitance and corresponding shift in resonant frequency. By variation of the frequency, at least one alternating signal may contain the fundamental resonant frequency or be close enough in frequency to cause resonance. The frequency is varied over a range of frequencies covering all of or portions of any designed tolerance of LC components 7, 8, 9 used in the LC filter and resonance circuit and, optionally, any externally connected capacitance.

In act 324, the variation of the frequency includes subharmonic frequencies of one or more of the attempted fundamental resonant frequencies or other possible resonant frequencies within the tolerance of the LC filter and resonance circuit with or without any possible externally connected capacitance. Such subharmonic frequencies, especially odd subharmonics (e.g., the third or fifth subharmonics), may generate resonance in the circuit but at lower amplitude than by driving the resonant circuit at the fundamental frequency. If the lamp 11 is first "primed" by applying a low amplitude voltage for an extended time, then an arc may be initiated in the lamp 11 more easily, i.e. by applying a voltage of lower amplitude or shorter duration than if the lamp 11 had not been so primed. If the LC filter and resonance circuit is driven at a subharmonic frequency for a period of time in order to create resonance at a low amplitude, the lamp 11 is thereby primed. Subsequent striking of the lamp 11 may be achieved by driving the LC circuit for a comparatively short time at the fundamental frequency.

In one example, the LC filter and resonance circuit has a typical fundamental frequency of 69 kHz. The circuit is first driven at the third subharmonic frequency of 23 kHz for a period of 4 ms, followed by six cycles of the fundamental frequency (lasting 87 μs), which may be sufficient to cause the lamp to strike. If the lamp does not strike, the pattern can be repeated as part of the strike routine. With each repetition, the two driving frequencies may be incremented slightly (while remaining in proportion to one another) to try to achieve better resonance, until the lamp 11 is successfully struck.

The duty cycle of the said two buck converters is controlled to ensure the inductors 5 and 6 do not saturate and thereby allow damaging high currents to flow in the main switches 1 and 2 and diodes 3 and 4. Current flows in the same direction through the serially connected inductors 5 and 6 between the high and low voltage rails 12, 13, allowing a build-up of current. A 50% duty cycle for alternating operation of the main switches 1 and 2 may saturate the inductors 5, 6 after two or more cycles. To allow sufficient current decay to avoid saturation at high frequency operation, a duty cycle less than 50% is used for each of the main switches 1, 2. Any duty cycle may be used, such as less than 30%, 25% or 20%. The duty cycle of the signals at the fundamental frequencies may be different or the same as the duty cycles of the signals at the subharmonics. Duty cycles of 50% may be used in alternative embodiments.

Different duty cycles may be provided for different frequencies or at different times. Variation of the frequency and duty cycle may cover a range of frequencies and a range of duty cycles. The frequency and duty cycle may be varied together or independently to control currents in the main switches 1, 2 and control the high voltage required for ionising the gas in the lamp 11 and initiating the arc. The duty cycle may be constant during variation of the frequency and vice versa. Such control of frequency may comprise several steps each of discrete frequency or a sweep of frequencies.

In one embodiment, the strike routine of act 322 is provided in Table 1 below:

TABLE 1

STRIKE ROUTINE.

| Time | Frequency description | Frequency | Duty Cycle |
|---|---|---|---|
| 4 mSec | ⅓ harmonic 1 | 20 kHz | 20% |
| 6 cycles | fundamental 1 | 62 kHz | 50% |
| 4 mSec | ⅓ harmonic 2 | 21 kHz | 21% |
| 6 cycles | fundamental 1 | 62 kHz | 50% |
| 4 mSec | ⅓ harmonic 3 | 22 kHz | 22% |
| 6 cycles | fundamental 2 | 72 kHz | 50% |
| 4 mSec | ⅓ harmonic 4 | 23 kHz | 23% |
| 6 cycles | fundamental 2 | 72 kHz | 50% |

The time provides a duration for applying the alternating signal. The fundamental frequency varies in two steps (fundamental 1 and 2), and the third subharmonic varies in four steps (⅓ subharmonic 1-4). Subharmonics 1 and 2 are subharmonics of slightly smaller and larger fundamental frequencies from fundamental 1, and subharmonics 3 and 4 are different smaller subharmonics of the fundamental 2. Other frequencies, frequency shifts, step sizes, number of frequencies, shift patterns or other characteristics may be used. Different duty cycles may also be used.

In act 326, the controller 110 tests for current indicating that the lamp has been struck. In act 328, if current is detected, the 2 sec timer is reset to zero. If the current is intermittent, the software loop carries on to the 5 sec limit in act 327. If no current is detected during any 2 second period of act 329, the ballast times out and goes to shutdown in act 314 after incrementing a log in act 312. If current is intermittent in act 329, the 2 second timer is reset each time there is current detected until either the 2 second timer in act 329 or the 5 second timer act 327 times out and the ballast shuts down in act 314. The strike routine process continues until sufficient current is detected in act 326 or one of the timers of acts 327 and 329 routes the process to a shutdown or failure mode of act 314. In the shutdown mode, different wait periods which increase incrementally are sequentially implemented for subsequent shutdowns before returning to act 306. A same wait period, a different number of wait periods or other wait periods than shown in FIG. 3 may be used. If neither of the timers has expired, the process of acts 322, 324 and 326 continues. Different subharmonics and fundamental frequencies are attempted pursuant to the strike routine.

In act 328, a timer is set. In act 330, the timer is pre-run. If current is detected in act 326, then the 2 second timer in acts 328 and 329 is reset and the pre-run timer is incremented in act 330. The ballast continues in pre run mode where it is possible to go back and call the strike routine if no current is detected at act 326. If there is current detected each time at act 326, the pre run timer 330 times out eventually and the ballast goes to run at act 332. In the pre run operation, the ballast may swap between the first mode (strike routine) and second mode (test for current at low frequency alternate half cycles) dependant on the detection of current or not.

In act 332, the ballast begins and runs in the second mode of operation. In the second mode of operation, the two buck converters are again each operated to control current in opposing half cycles of low frequency lamp current to give a near square wave current output in the lamp. The high frequency ripple current from the switching of the two buck converters is bypassed to the current measuring node at the transformer 10 by the capacitor 7. The voltage on the capacitor 7 changes only slightly with the incoming current from the buck converters. The resonant circuit of the inductor 8 and capacitor 9 filters additional high frequency ripple, further attenuating any high frequency current in the connected lamp 11. The lamp current is substantially square wave with a very low amplitude of high frequency ripple current superimposed.

For operation in the second mode, the main switches 1, 2 operate as substantially zero current switches to limit current loss. The switches 16, 17 and resistors 18-21 form two buck converter switching semiconductor gate drive circuits. The switches 16, 17 operate in different states for the different modes of operation of the ballast.

In the first, high frequency mode of operation, the switching ON of the semiconductor switching devices 1, 2 is required to be fast so as to provide good control of duty cycle. Such fast switching is provided by low value gate drive resistors 18 and 19 each connected in series with respective switches 16 and 17. When one of the switches 16, 17 is ON, the gate of the corresponding buck converter main switch 1, 2 is switched by the gate driver IC 22 via the low value resistor 18, 19 in parallel with the higher value resistor 20, 21.

In one embodiment, a frequency of 155 Hz is used. In the second mode of operation, the switching ON of the main switches 1, 2 is required to be slower so as to charge the turn OFF current commutating capacitors 23, 24 slowly to minimise losses. Such losses are unsustainable in the second mode of operation, which is intended to run continuously, rather than in the first mode of operation, which is intended to run only temporarily on start-up. The slower switching is provided by higher value gate drive resistors 20, 21 connected in parallel with the serially connected low value resistors 18, 19 and the switches 16, 17. When one of the semiconductor switching devices 16, 17 is OFF, the gate of the corresponding buck converter main switch 1, 2 is switched ON by the driver IC 22 via the higher value gate drive resistor 20, 21.

Control of the switches 16, 17 that connect or disconnect the low value gate drive resistors 18, 19 for switching ON of the buck converter main switch 1, 2 may be via a passive RC charge circuit or by active means provided by digitally stored code or program or other digital or analogue control means. The switch on of the main switches 1, 2 occurs at substantially zero inductor current, so the main switches 1, 2 is provided substantially only the current to discharge the commutating capacitors 23, 24. The switch voltage gradually transitions.

In both modes of operation, the switching OFF of the main switch 1, 2 by the gate driver IC 22 is via the high value resistor 20, 21 in parallel with the serially connected low value resistor 18, 19 and the parasitic diode in the switching semiconductor device 16, 17. The semiconductor switching device turns OFF very fast and the current is commutated away from the switching device 1, 2 into the respective capacitor 23, 24 in order to avoid losses in the switching device 1, 2. The switched resistors 18-21 and the commutating capacitors 23, 24 allow operation of the main switches 1, 2 as substantially zero current switching devices. Any time period for transition of the turn-off voltage may be used, such as 250 nanoseconds.

In the second mode of operation, the buck converter inductor current is controlled such that the active buck converter for the present half cycle of low frequency lamp current is switched OFF at nominally two times the nominal lamp current and switches ON immediately or after a delay when the buck converter inductor current is at zero. Since the rise and fall of current in the buck converter inductor 5, 6 is substantially linear with time, the average inductor current may be substantially the same as the nominal lamp current. Even though the main switches 1 and 2 switch off at about two times the nominal lamp current. Switching losses may be avoided by the commutating capacitors 23, 24 and allow a smaller main switch 1, 2, such as a surface mounted transistor. The high frequency ripple current from the switching of the two buck converters is bypassed by the capacitor 7 and attenuated by the LC filter formed by the inductor 8 and capacitor 9. Despite the large changes in current in the buck converter inductor 5, 6, the current is the lamp 11 remains substantially a square wave with a relatively small amount of superimposed high frequency ripple.

After striking the lamp 11 in the first mode of operation and switching to the second mode of operation, the lamp warm up current which is typically between 1.2 and 1.8 times the nominal lamp running current is controlled by an average current control circuit. The average current control circuit includes the resistor 29, capacitor 30, rectifier circuits 25, 26 and current transformer load resistor 27. The resistor 29 and capacitor 30 act to average the voltage proportional to the current signal from the current transformer 10. The average current signal, which is the average of the sum of the lamp 11 and capacitor 7 currents, is compared to a reference voltage value set by potential divider resistors 32 and 33. The comparison is made by the operational amplifier 31, which is configured as an integrator. If the voltage representing the average current signal is below that of the reference value signal, the output of the operational amplifier 31 changes at a rate controlled by the capacitor 34 in a positive direction, and if the voltage representing the average current signal is above that of the of the reference value signal, the output of the operational amplifier 31 changes at a rate controlled by capacitor 34 in a negative direction. This output signal 35 is used by the comparator 28 to control the average lamp current during lamp warm up when the lamp arc voltage is low compared to the nominal fully warmed up lamp voltage. The comparator 28 compares the instantaneous lamp 11 and capacitor 7 current with the value of the output signal 35 provided via resistor 36, diode 37 and resistor 38 from the average current control circuit. The lamp warm up current is controlled to give ideal lamp warm up current and maintain safe current in the buck converter switching semiconductors 1, 2.

The ballast circuit is provided with a fixed DC bus voltage on positive and negative rails 12 and 13 such that current flowing in the DC bus is substantially proportional to power in the lamp. The DC bus current is sensed by the controller 110 using the resistors 39-42. The voltage drop across the resistors 39-42 is substantially proportional to power in the lamp.

As the lamp warms up and the arc voltage increases near to nominal lamp voltage, the lamp power control circuit controls the current in the lamp 11. The lamp power control circuit includes the operational amplifier 43, resistors 44, 45, 46 and 47, capacitor 48 and output resistor 49. By comparing the voltage drop at the power sensing resistors 39-42 to a reference voltage signal provided by the resistor potential divider network of resistors 44-47, the output 50 of the operational amplifier 43 changes positive or negative depending on the difference between the power proportional voltage drop sensed in the power sensing resistors 39-42 and the reference voltage signal. This power difference output signal is used to control the sum of the average first stage capacitor current and the lamp current via a potential divider. The potential divider includes the resistors 49, 38, and 51. The comparator 28 compares the instantaneous lamp 11 and capacitor 7 current with the value of the power difference output signal 50. When the lamp 11 approaches operating temperature and nominal operating voltage, the lamp power is accurately controlled at nominal lamp power by altering the control reference signal on the comparator 28, thus altering the value of current at which the comparator 28 output logic signal changes state, thus switching the logic level on the shutdown pin of the gate driver IC 22, and thus switching OFF or ON the active buck converter circuit in response to the comparison of instantaneous current signal and desired current signal from the power control circuit.

Independent control by the comparator 28, amplifier 31 and amplifier 43 may be used, such as independently controlling high frequency and average lamp current. In one embodiment, zero current is measured to switch on the main switches 1, 2. In other embodiments, the zero current is assumed due to timing with or without additional delay at the zero current. One option is to use a secondary winding on the buck converter inductor. When the stored energy in the inductor core is fully dissipated (e.g., zero flux=zero current), the voltage across the secondary collapses to zero. This may be sensed and then used to turn on the main switches again.

Switching between the first and second modes of operation is dependent upon successful striking of the lamp 11 and establishment of a stable arc in the lamp 11. The first mode of operation may be followed by a change to the second mode of operation during which the lamp current is monitored in act 334. If there is no lamp current sensed after switching to the second mode of operation, there will be no switching OFF of the active buck converter for the present half cycle of low frequency. This may be sensed from the signal from the current transformer 10 via current signal rectifier circuit 25, 26, current transformer load resistor 27 and comparator 28. The output of the comparator 28 controls the logic level on the shutdown pin of the gate driver IC 22. This is also connected to one of the input pins on the controller 110 which may be programmed to respond if no change in the logic level is sensed in response to lamp current. Other arrangements for monitoring lamp current and/or responding are possible.

If no lamp current is sensed, the process may switch back to the first mode of operation where high voltage will again attempt to strike the lamp 11, such as through acts 312 and 314 or through a different route. This switching from first to second and back to first mode of operation may be attempted for any number of times or amount time as determined by a stored program or other digital or analogue device. Such switching back and forth between first and second modes may be terminated by an overriding timer such that the circuit shuts down for a predetermined time before again attempting to strike the lamp and establish a stable arc (act 314) or may after several such cycles of the timer shutdown permanently until power is removed and subsequently restored to the circuit. Such control strategy may be stored as a program or accomplished by other digital or analogue devices.

In act 336, the temperature is checked during operation of the lamp 11 in the second mode. The thermistor or other temperature sensor determines whether the circuit or a portion of the ballast is over a threshold temperature, such as 90 degrees Celsius, the same temperature as act 310 or a different temperature. If the temperature exceeds the threshold, a log in a memory is incremented or saved in act 340. A thermal shutdown is then implemented in act 342. The shutdown is for sufficient time, such as 30 minutes, to cool the ballast and/or lamp 11. The ballast may then be restarted in act 306.

In act 338, the time the lamp 11 and/or ballast circuit has been operating is logged. The process continues to run the lamp 11 in act 332 until the ballast is switched off, insufficient current is sensed in act 334 or the temperature becomes excessive in act 336.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A high intensity discharge lamp ballast circuit comprising:
   first and second lamp terminals operable to receive a high intensity discharge lamp between the first and second lamp terminals;
   a first inductor connected with the first lamp terminal;
   a first capacitor connected with the first inductor and the second lamp terminal; a second capacitor connected with the first lamp terminal;
   second and third inductors connected with the first inductor and the first capacitor;
   wherein the first, second and third inductors and the first capacitor connect at a common node, and wherein the second capacitor connects in parallel with the first and second lamp terminals;
   further comprising:
   a source of high voltage having a positive rail and a negative rail;
   a first switch connected between the positive rail and a first node, the second inductor connected between the first node and the common node;
   a second switch connected between a second node and the negative rail, the third inductor connected between the second node and the common node; and
   a controller for operating the first and second switches.

2. The circuit of claim 1 wherein the first inductor and the second capacitor form a resonant circuit, and the first capacitor is a high frequency bypass capacitor.

3. The circuit of claim 1 further comprising:
   a first buck converter connected with the second inductor; and
   a second buck converter connected with the third inductor.

4. The circuit of claim 1 further comprising:
   a first diode connected with the first node and the negative rail;
   a second diode connected with the second node and the positive rail;
   first and second commutating capacitors connected in parallel with the first and second switches, respectively.

5. The circuit of claim 1 further comprising a current limiting circuit, the controller being responsive to the current limiting circuit.

6. The circuit of claim 5 wherein the current limiting circuit comprises:
   a transformer connected to measure the current through a lamp connected between the first and second lamp terminals;
   a converter operable to convert the measured current to a measured voltage signal; and
   a comparator having a first comparator input connected to the converter, a second comparator input connected to a first reference voltage, and a comparator output connected to the controller, the comparator output operable to provide a comparison signal determined as a function of a difference between the measured voltage signal and the first reference voltage.

7. The circuit of claim 6 wherein the current limiting circuit further comprises:
   an integrator having a first integrator input connected to the converter, a second integrator input connected to a second reference voltage, and an integrator output connected to the second comparator input, the integrator operable to output to the comparator a signal determined by an average over time of the difference between the measured voltage signal and the second reference voltage.

8. The circuit of claim 4 wherein the controller connects to first and second gates of the first and second switches, respectively, via first and second gate drive circuits, respectively, each of the first and second gate drive circuits comprising:
   a gate drive switch in series with a first gate drive resistor between an output from the controller and the first or second gate of the first or second switch, respectively; and
   a second gate drive resistor connected between the output from the controller and the first or second gate of the first or second switch, respectively, in parallel with the gate drive switch and the first gate drive resistor;
   wherein the first gate drive resistor has a lower resistance than the second gate drive resistor.

9. A method of powering a high intensity discharge lamp connected between first and second lamp terminals of a lamp ballast circuit, the method comprising the steps of:
   in a first mode, operating first and second switches alternately at a first switching frequency so as to cause resonance in first, second and third inductors and a first capacitor, the resonance operable to generate a strike voltage between the first and second lamp terminals; and
   subsequently, in a second mode, while the lamp continues to conduct, operating the first and second switches alternately at a second switching frequency that is lower than the first frequency so as not to cause resonance, and using a second capacitor to divert high frequency ripple current away from the lamp.

10. The method of claim 9 further comprising:
    in the first mode, varying the first switching frequency over a continuous or discrete range of possible resonant frequencies.

11. The method of claim 10 further comprising:
    in the first mode, operating the first and second switches alternately at an odd subharmonic of the first switching frequency before operating the first and second switches at the first switching frequency.

12. The method of claim 11 wherein operating the first and second switches at the odd subharmonic comprises with less than a 50% duty cycle.

13. The method of claim 9 wherein the first inductor connects with the first switch and the second inductor connects with the second switch, and further comprising:
    in the second mode, turning off an active one of the first or second switches when the current in the respective first or second inductor reaches substantially twice a nominal working current of the lamp, only one of the first and second switches and the respective first and second inductor being active during each half cycle of the second switching frequency; and
    turning on the active one of the first and second switches when the current in the lamp reaches substantially zero.

14. The method of claim 9 wherein operating the first and second switches in the first mode comprises turning on first and second gate drive switches, the first and second gate drive switches operating the first and second switches via first and second gate drive resistors; and wherein operating the first and second switches in the second mode comprises turning off the first and second gate drive switches, the first and second switches operating via the third and fourth gate drive resistors.

15. The method of claim 14 wherein operating the first and second switches in the first mode with the first and second gate drive resistors is performed at a first switching speed, and wherein operating the first and second switches in the second mode with the third and fourth gate drive resistors is at a second switching speed slower than the first switching speed and is with substantially zero current switching.

16. The method of claim 14 further comprising:
controlling the first and second gate drive switches with a short duty cycle, whereby the first and second gate drive switches are turned off before the first and second switches are turned off so that the first and second switches are turned off via the second gate drive resistors.

17. A method of striking a high intensity discharge lamp, the method comprising the steps of:
supplying a first alternating signal to lamp terminals at a first subharmonic of a first resonant frequency and with a less than 50% duty cycle for a first period of time; and thereafter
supplying a second alternating signal to the lamp terminals at the first resonant frequency; and
alternately repeating the supplying of the first and second alternating signals as a function of variation of the first resonant frequency and the subharmonic of the first resonant frequency, the variation of the first resonant frequency being over a continuous or discrete range of possible resonant frequencies.

18. The method of claim 17 wherein supplying the second alternating signal comprises supplying the second alternating signal with a less than 50% duty cycle.

19. The method of claim 17 wherein supplying the first alternating signal with the less than 50% duty cycle comprises limiting current in inductors to below a malfunction current.

20. The method of claim 17 wherein supplying the first and second alternating signals comprises operating first and second switches alternately, and wherein the subharmonic comprises an odd subharmonic.

21. A method of striking a high intensity discharge lamp, the method comprising the steps of:
supplying a first alternating signal to lamp terminals at a first subharmonic of a first resonant frequency and with a less than 50% duty cycle;
supplying a second alternating signal to the lamp terminals at the first resonant frequency;
wherein supplying the first alternating signal comprises supplying for a first period of time a first alternating voltage of insufficient amplitude to strike the lamp; and
wherein supplying the second alternating signal comprises supplying for a second period of time shorter than the first period of time a second alternating voltage of sufficient amplitude to strike the lamp.

22. The method of claim 21 wherein the lamp terminals connect to a resonant circuit, and wherein supplying the second alternating signal comprises driving the resonant circuit at a possible fundamental frequency.

23. The method of claim 21 wherein supplying the first alternating signal comprises supplying with the duty cycle less than 25%.

24. A high intensity discharge lamp ballast circuit comprising:
first and second performance switches;
first and second main switches;
first and second lower value resistors connected between the first and second performance switches and the first and second main switches, respectively;
first and second higher value resistors connected with the first and second main switches, respectively; and
a controller operable to cause the first and second main switches to operate at lower and higher frequencies, to cause the first and second performance switches to connect the first and second lower value resistors in parallel with the first and second higher value resistors, respectively, at the higher frequencies, and to cause the first and second performance switches to disconnect the lower value resistors at the lower frequencies.

25. The circuit of claim 24 wherein the first and second main switches comprise buck converters operable in a substantially zero current state at the lower frequency in response to the disconnection.

26. The circuit of claim 24 further comprising:
first and second inductors connected with the first and second mains switches, respectively,
a third inductor connected between the first and second inductors and a first lamp terminal;
a first capacitor connected with the first lamp terminal; and
a second capacitor connected between the first and second inductors and a second lamp terminal.

* * * * *

UNITED STATES PATENT AND TRADEMARK OFFICE
CERTIFICATE OF CORRECTION

PATENT NO. : 7,589,480 B2
APPLICATION NO. : 11/442627
DATED : September 15, 2009
INVENTOR(S) : Greenwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-first Day of September, 2010

David J. Kappos
*Director of the United States Patent and Trademark Office*